(12) United States Patent
Erdmann (10) Patent No.: US 10,668,974 B2
(45) Date of Patent: Jun. 2, 2020

(54) THROTTLE TUBE WITH CABLE SIDE RADIAL BEARING LOCATED INLINE WITH CABLE CAM HOUSING

(71) Applicant: Thomas Erdmann, Franklin, MA (US)

(72) Inventor: Thomas Erdmann, Franklin, MA (US)

( * ) Notice: Subject to any disclaimer, the term of this patent is extended or adjusted under 35 U.S.C. 154(b) by 0 days.

(21) Appl. No.: 16/168,035

(22) Filed: Oct. 23, 2018

(65) Prior Publication Data

US 2019/0202523 A1 Jul. 4, 2019

Related U.S. Application Data

(60) Provisional application No. 62/612,760, filed on Jan. 2, 2018, provisional application No. 62/639,023, filed on Mar. 6, 2018.

(51) Int. Cl.
*B62K 23/04* (2006.01)
*F16C 1/18* (2006.01)
*B62K 11/14* (2006.01)
*F16C 35/063* (2006.01)

(52) U.S. Cl.
CPC ............. *B62K 23/04* (2013.01); *B62K 11/14* (2013.01); *F16C 1/18* (2013.01); *F16C 35/063* (2013.01); *F16C 2326/20* (2013.01)

(58) Field of Classification Search
CPC ........ B62K 23/04; B62K 23/02; B62K 21/26; B62K 11/14; F16C 1/18
See application file for complete search history.

(56) References Cited

U.S. PATENT DOCUMENTS

| 5,134,897 | A | * | 8/1992 | Romano | ................ | B62K 23/04 |
|||||||74/473.13|
| 5,437,206 | A | * | 8/1995 | Boor | ..................... | B62K 23/04 |
|||||||188/24.22|
| 5,802,927 | A | | 9/1998 | Yu et al. | | |
| 5,893,295 | A | | 4/1999 | Bronnert | | |
| 7,770,490 | B1 | | 8/2010 | Weiss | | |
| 8,850,919 | B2 | | 10/2014 | Weiss | | |
| 9,746,872 | B2 | * | 8/2017 | Thielvoldt | ............... | G05G 1/04 |
| 2003/0150287 | A1 | * | 8/2003 | Lev-Ran | ................. | B62K 23/04 |
|||||||74/488|
| 2006/0053936 | A1 | * | 3/2006 | Wancket | ................ | B62K 23/04 |
|||||||74/501.6|

FOREIGN PATENT DOCUMENTS

| DE | 19627593 A1 | * | 1/1998 | ........... B62K 15/006 |
| FR | 2789648 A1 | | 8/2000 | |
| GB | 710443 A | * | 6/1954 | .............. B62L 3/026 |
| JP | 2000006873 A | * | 1/2000 | .............. B62K 23/04 |
| WO | 9518035 A1 | | 8/2000 | |

OTHER PUBLICATIONS

"Pro Taper Twister Throttle Tube", Faster Motocross, Pro Taper MX Parts, Nov. 15, 2017.

* cited by examiner

*Primary Examiner* — Luis A Gonzalez (74) *Attorney, Agent, or Firm* — Barlow, Josephs & Holmes, Ltd.

(57) ABSTRACT

A throttle tube including a radial bearing on a cable side of the throttle tube. On the cable side of the throttle tube, a bearing is used to support the throttle tube on the handle bar to avoid the undesirable friction feeling that would otherwise resulting due to the rubbing of the throttle tube against the supporting handle bar. The bearing on the cable side is located inline with the cable cam housing and the cable itself.

16 Claims, 13 Drawing Sheets

THROTTLE TUBE WITH CABLE SIDE RADIAL BEARING LOCATED INLINE WITH CABLE CAM HOUSING

CROSS REFERENCE TO RELATED APPLICATION

This application is related to and claims benefit of U.S. Provisional Application No. 62/612,760 filed Jan. 2, 2018, and U.S. Provisional Application No. 62/639,023 filed Mar. 6, 2018, the entire contents of which are incorporated herein by reference.

BACKGROUND OF THE INVENTION

1. Technical Field

The invention is generally related to throttle tubes for motor vehicles, such as motorcycles, snowmobiles, ATVs, and the like. The present invention has particular applicability for use as a throttle tube for motorcycles, namely, dirt or motocross motorcycles.

2. Background of the Related Art

Figure 1:
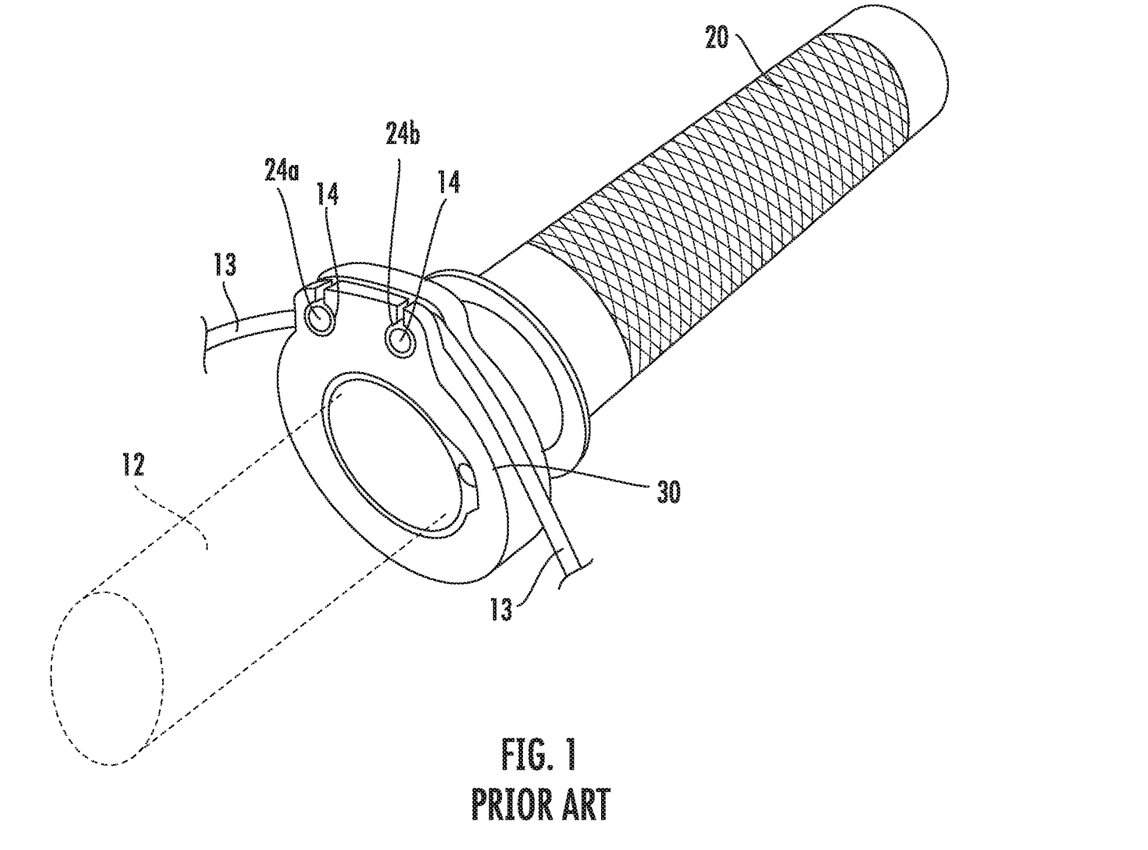
FIG. 1 shows a perspective view of a first prior art throttle tube.
Figure 2:
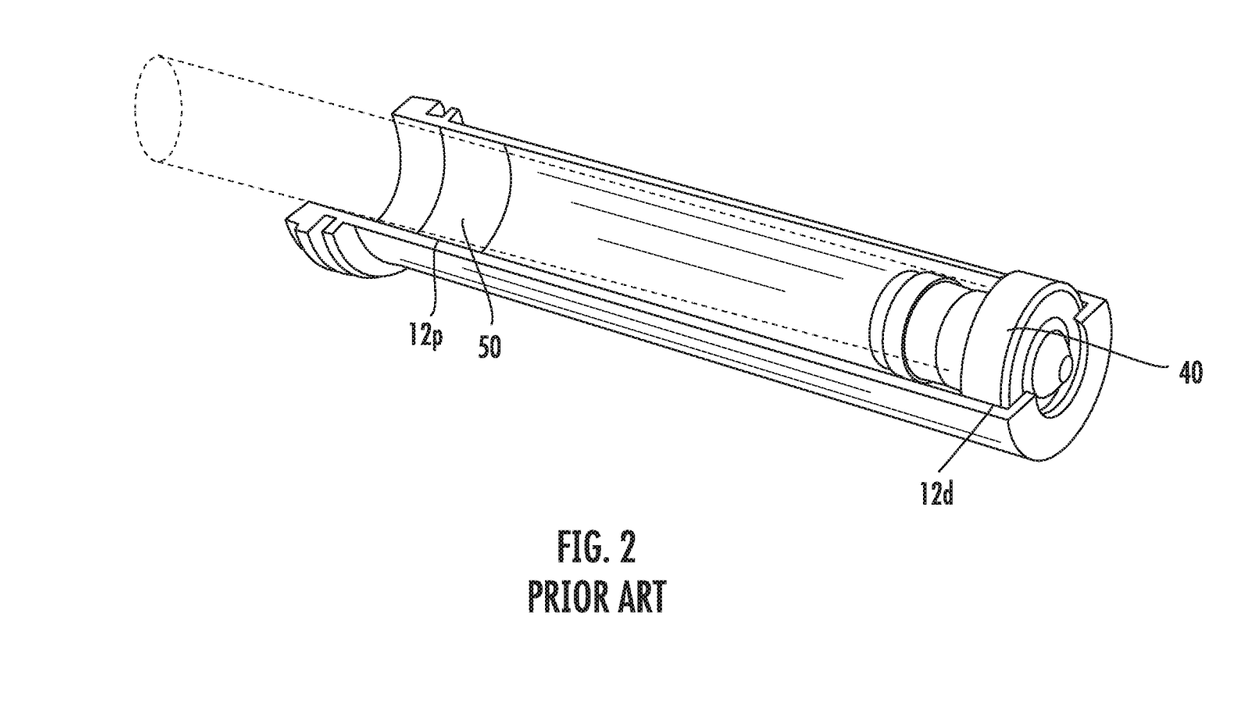
FIG. 2 shows a perspective view and a cross-sectional view of a second prior art throttle tube with a handle bar mount for the open end and a nylon bearing sleeve on the cable side.

It is well known in the art of dirt bikes that handle bars are provided for steering the bike. Further, a motor is provided to provide power to the bike. To control the motor, as shown in FIGS. 1 and 2, a "throttle tube" 20 is often provided on the end of a one, or both of the handle bar(s) 12. In one example, a cylindrical configuration 20 is slid laterally onto the free end of a handle bar 12. As is well known in the art, a throttle tube 20 can easily rotationally twist over the outer surface of the handle bar 12 and about the central axis of the handle bar 12. Through rotation of the throttle tube 20, the motor can be controlled to provide power to the bike. This is so well known in the art that further discussion of this configuration need not be discussed.

As noted above, the throttle tube 20 is further connected to the motor. The throttle tube 20 is connected via a cable 13, as is well known in the art, whereby twisting of the throttle tube causes the cable to be pulled and released thereby controlling the throttle of the motor. As seen in FIG. 1, a number of seats 24a, 24b are provided on a cable connect 30 to receive the ball end 14 of a throttle cable 13. This interconnection is also very well known in the art. As is well known, this prior art throttle tube rides directly on the outer surface of the handle bar and is constantly being twisted back and forth about and in contact with the supporting handle bar therein. Eventually, the handle bar 12 or the throttle tube 20 gets worn out resulting in an undesirable "friction feeling." Dirt bike riders are very particular about the feel of the throttle control and the resulting friction feeling, due to the wear of the handle bar rubbing against the throttle tube is unacceptable for rider performance.

FIG. 2 shows the prior art throttle tube, showing features that attempt to address the above problems associated with the throttle tube rubbing on the handle bar. First, the open free end 12d of the handle bar 12 is secured by a rotating radial ball bearing 40 at the distal end of the handle bar. At the cable-side of the throttle tube 12p, a nylon sleeve 50 is provided. Thus, the handle bar 12 rubs against the nylon sleeve 50 in an attempt to smooth out the contact of the handle bar 12 to the throttle tube 20. For example, a PTFE sleeve bearing 50 can be provided or nylon tape adhered to the inside of the throttle tube 20. Despite these efforts, the bearing of the handle bar 12 to the throttle tube 20 will eventually break down resulting in the same undesirable friction feeling.

In view of the foregoing, there is a demand for an improved throttle tube configuration that avoids frictional forces which can result in a "friction feeling" against the handle bar during a throttling of the motor. There is a further demand for an improved throttle tube that is smoother in operation. Further still, there is a demand for a throttle tube that is more consistent in its operation over the life of the throttle tube.

SUMMARY OF THE INVENTION

The present invention preserves the advantages of prior art throttle tubes, provides new advantages not found in currently available throttle tubes, and overcomes many disadvantages of such currently available throttle tubes.

The present invention provides a new and unique throttle tube design that includes a bearing on the cable side of the throttle tube. In some embodiments, the bearing is a radial bearing. Such a configuration can avoid the undesirable friction feeling that would otherwise result due to the rubbing of the throttle tube against the supporting handle bar. Moreover, the use of a cable-side radial bearing is less likely to wear which would result in the undesirable frictional feeling due to the premature wearing of nylon sleeve bearings.

It is, therefore, an object of the present invention to provide an improved throttle tube configuration that avoids a friction feeling against the handle bar.

There is a further object of the present invention to provide an improved throttle tube that is smoother in operation with a friction free feeling.

Yet another object of the present invention is to provide a throttle tube that is more consistent in its operation over the life of the motor bike.

BRIEF DESCRIPTION OF THE DRAWING FIGURES

The novel features which are characteristic of the present invention are set forth in the appended claims. However, the invention's preferred embodiments, together with further objects and attendant advantages, will be best understood by reference to the following detailed description taken in connection with the accompanying drawings in which:

DESCRIPTION OF THE INVENTION

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal. Further, for ease of discussion, the description herein is directed to a throttle tube for dirt bikes but one of ordinary skill in the art would understand that the present disclosure is not limited to dirt bikes or to throttles per se.

Figure 3:
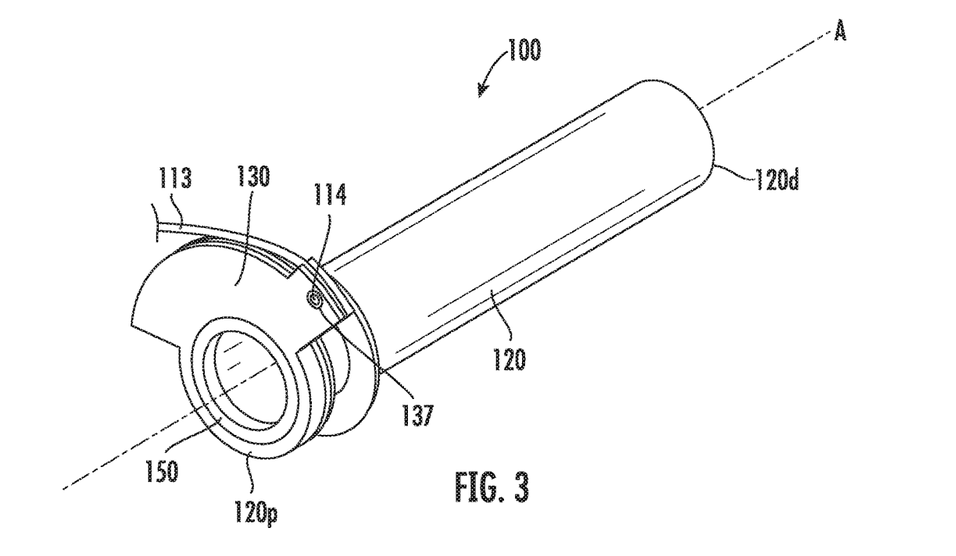
FIG. 3 is a perspective cable-side view of the throttle tube of the present invention.

The present disclosure is generally directed to a bearing system 100 for a throttle tube 120 on a handle bar 110, for example. In general, as shown in FIGS. 3-14, the acceleration and speed of a motor bike, dirt bike, motor cycle, etc. are controlled by means of a throttle tube 120 disposed on one of the handle bars 110. The throttle tube 120 is supported by the cylindrical handle bar 110 and, upon rotation of the throttle tube 120 about the handle bar 110, a throttle cable 113 is pulled or released, to control the power from the motor. At a proximal end of the throttle cable 113, a ball or cylinder 114 is preferably disposed on the free end of the cable 113, as is well known in the art, and received in a cable connect 130 portion at the, proximal, cable end 120p of the throttle tube 120. Other interconnections are possible but the cable and ball or cylinder end are preferably used. Cable 113 and its ball or cylinder end 114 are shown in FIG. 3 but, for ease of illustration, such a cable 113 and ball or cylinder end 114 are not shown in all of the figures but it should be understood that such a cable 113 and ball or cylinder end 114 are used as such, as described in detail below.

Radially inward of, and axially aligned with, the cable connect 130 a radial bearing 150 can be disposed. The radial bearing 150 can have an inner diameter which is substantially similar to the outer diameter DH of the handle bar 110. At the opposite, distal, end 120d of the throttle tube 120 a free end mount 140 can be disposed coaxially within both the throttle tube 120 and the handle bar 110. The free end mount 140 can include, for example, an outer radial bearing 144 to rotationally support the distal end of the throttle tube 120d at the distal end of the handle 110. As such, the throttle tube 120 is supported by two radial bearings 140, 150 to allow for a low friction rotation of the throttle tube 120 about the handle bar 110. Advantageously, the two radial bearings 140, 150 can provide a reduced frictional feel for the throttle tube 120 without the use of bearings that easily and quickly wear. Further, the present disclosure provides for a cable side bearing mount in the throttle tube 120 which does not require additional material or a reduction of diameter of the handle bar.

The throttle tube 120 can be a generally cylindrical tube extending from a proximal end 120p to a distal end 120d. In alternative embodiments, the outer surface can have any cross-sectional shape, for example, square, pentagon, hexagon, etc., while the inner surface can have a circular cross-sectional shape. In some embodiments, the outer surface 126 of the throttle tube 120 can be knurled or textured to provided added grip. The throttle tube 120 can include a lumen 121 extending from the proximal most end 120p to the distal most end 120d defining a through hole to receive a handle bar 110. As noted previously, the surface of the inner lumen 121 can have a circular cross-sectional shape so that it can fit around the cylindrical shape of the handle bar. The throttle tube 120 can be formed from any suitable material including most metals, plastics, or composite materials. At the proximal end 120p a throttle cable connect, or flange, 130 can be provided to receive a ball or cylinder end 114, from a throttle cable 113. Alternatively, or additionally, other control cables 113, for example, can be connected to the throttle cable connect via a ball or cylinder 114 on the free end of the cable 113. The cable connect 130 can be a generally partial cylindrical arc shape, extending an angle α, which has a larger outer diameter D1 than the remainder of the throttle tube 120, and a larger inner diameter D2 than the remainder of the throttle tube 120. The inner diameter of surface 131 of the cable connect 130 can abut a shoulder 133 of the throttle tube to define a bearing seat 132. The inner diameter surface 131 of the cable connect can have a length L. Integral to the cable connect 130, an arc shaped cam 134 can be disposed around a portion of the cable connect. In some embodiments, the arc 134 can extend over an angle α in the range of 90-180 degrees. In other embodiments, the arc 134 can extend a full 360 degrees around the throttle tube 120. The arc shaped cam 134 can include a circumferentially running groove 135 at the circumferential edge running the length of the arc 134. The groove 135 can be sized to receive at least one throttle cable (not shown). At one end of the arc 134, a cable connect tab 136 can be included to receive a throttle cable ball or cylinder end 114 for securing the throttle cable 113 to the cable connect 130. The tab 136 can extend radially outward of the arc 134, or can be inline with the arc 134. In the illustrated embodiment, the cable connect 130 is integral with the throttle tube 120. The arrangement can be described as the cable connect 130 and the throttle tube 120 being monolithic. In other, alternative arrangements throttle tube 120 and the cable connect 130 can be separate pieces that are fitted or fixed together.

As shown in FIGS. 3-8, the handle bar 110 is representationally shown in broken lines for ease of illustration purposes. At the cable side opening 120p of the throttle tube 120, a bearing 150, such as a radial, metal, or needle bearing and the like, is provided in a unique configuration in the throttle tube 120, as discussed further below. In FIGS. 3-7, the radial bearing 150 is shown in a conceptual/representation manner as a ring. One example of such a bearing 150 is shown in detail in FIG. 8. The radial bearing 150, of the type shown in FIG. 8 with ball bearings residing within an outer casing, is preferably employed with the present invention. As above, the bearing 150 can be any type of bearing, such as a radial bearing, a needle bearing or a metal bearing. Therefore, it should be understood that reference to the bearing 150 being a radial bearing is by way of example and the present invention is not intended to be limited to such a radial bearing. Therefore, any type of bearing may be used to carry out the present invention.

Figure 4:
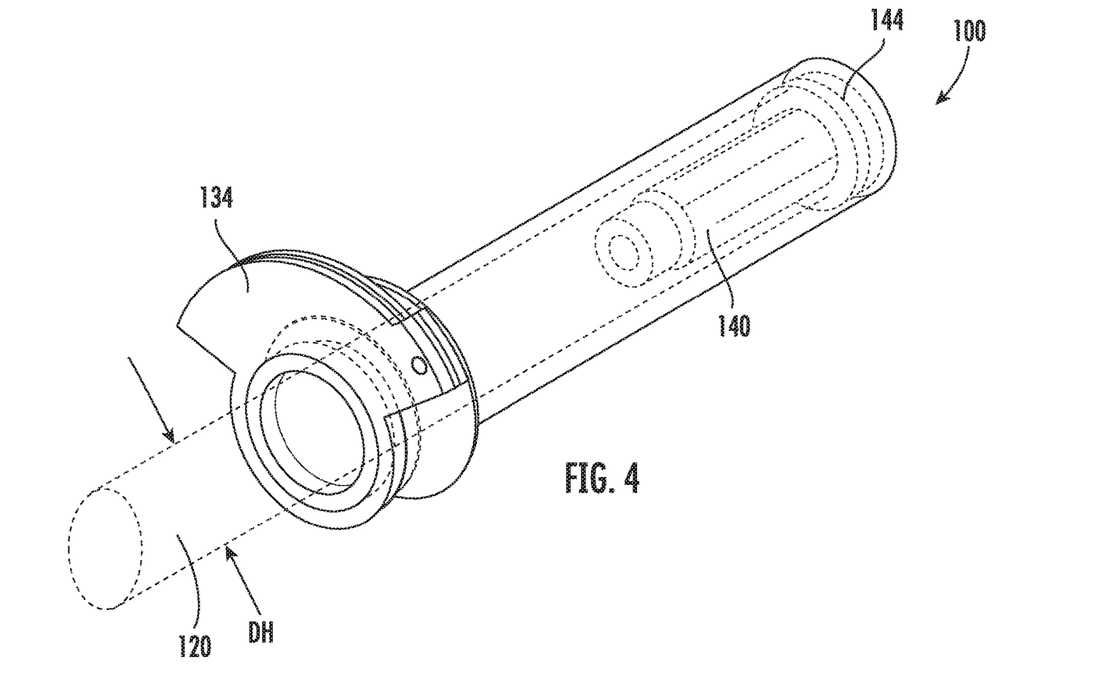
FIG. 4 is a partially broken-away view of the throttle tube of FIG. 3 disposed on a handle bar.
Figure 5:
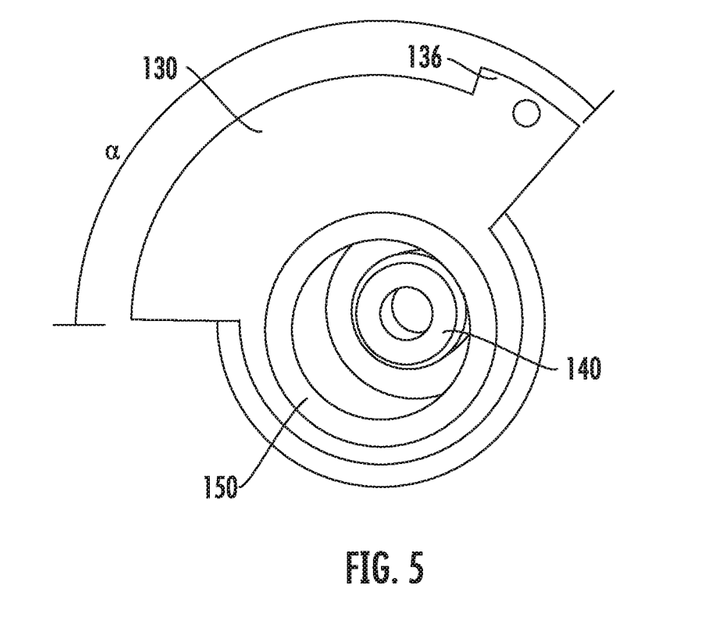
FIG. 5 is a perspective front end view of the throttle tube of FIG. 3.
Figure 6:
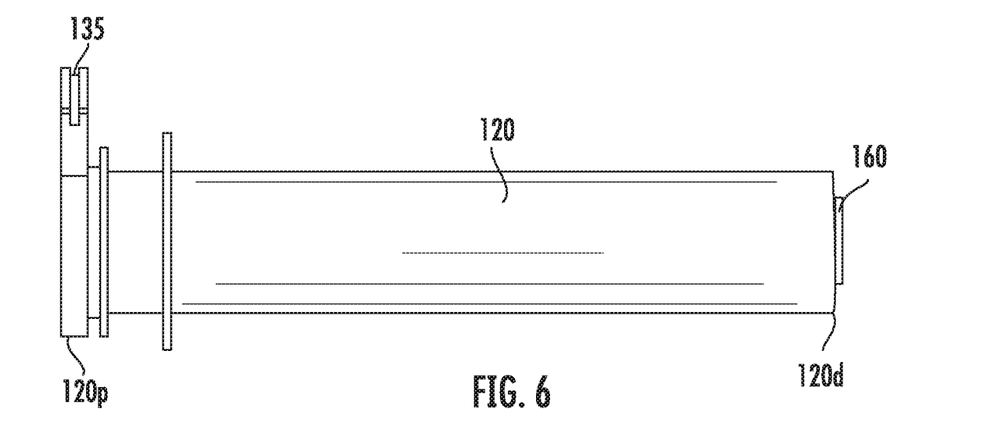
FIG. 6 is a side view of the throttle tube of FIG. 3.

As best can be seen in FIGS. 3, 4 and 5, the radial bearing 150 can be fit into the throttle tube, so it is fixed in place. The bearing 150 can be fixed by means of a frictional fit, by means of a mechanical fixation, or other fixation type. In a preferred embodiment, the radial bearing 150 is disposed aligned, along the central axis A of the throttle tube 120, with the cable connect housing 130. For example, the bearing can be disposed within the cable connect housing 130 such that it is axially aligned with the groove 135. A first distal face 152 of the bearing can be disposed directly against the shoulder 133 of the throttle tube 120 and the second, proximal face 154 can be disposed in the same plane, or co-planar, as the proximal face 130p of the cable connect. In some embodiments, the inner diameter of the bearing 150 can be smaller than the inner diameter of the throttle tube 120 or can be the substantially the same as the handle bar 110. The bearing 150 can be frictionally fit to the handle bar such that the bearing can rotationally support the proximal, cable end, 120p of the throttle tube 120 on the handle bar 110. This arrangement advantageously provides for support of the throttle tube 120 directly aligned, radially inward, of the cable groove 135. As the throttle tube 120 is supported by the bearing 150 that is axially aligned with the throttle groove, there is minimal cantilevered force created on the throttle tube 120 orthogonal to the central axis A of the throttle tube 120. This arrangement can advantageously limit the wear on both the handle bar 110 and the throttle tube 120. Thus, a cable 113 can ride, in the groove 135, on the outside of the throttle tube 120 and about the cable side bearing 150 so that when the cable is pulled by the rotation of the throttle tube 120, the opposing end of the cable can control the motor to which it is connected, as is well known in the art.

Therefore, the cable side bearing 150 is not only on the cable side 120p of the throttle tube 120 but literally axially aligned with the cable itself. The portion of the throttle tube 120 where the bearing 150 is aligned with the groove 135 of the cable connect 130 is quite thick, unlike the thin portion of the throttle tube that is grasped by the user, which enables a large radial bearing 150 to be used rather than a simple nylon sleeve of the prior art discussed above. In other words, the location of the radial bearing 150 is inline with the groove 135, and thus the cable 113, can enable the radial bearing to be much larger and therefore more effective in reducing friction.

The bearing 150 may be configured in any size or configuration to suit the handle bar 110 and throttle tube 120 configuration. For example, the bearing 150 may be, in inches, 0.875 inner diameter×1.125 outer diameter×0.156 wide but may be of any size. The size of the bearing 150 and the inner diameter of the of the cable connect 130 can be sized to be complementary because the cable connect 130 has a larger outer diameter than the remainder of the throttle tube 120. As there is more material in the cable connect, the structure is structurally able to support a radial bearing, for example, which is larger than the outer diameter of the distal portion of the throttle tube 120. The throttle tube 120, bearing 150 and free end mount 140 are preferably made of metal but can be made of any material to suit the application at hand.

Figure 7:
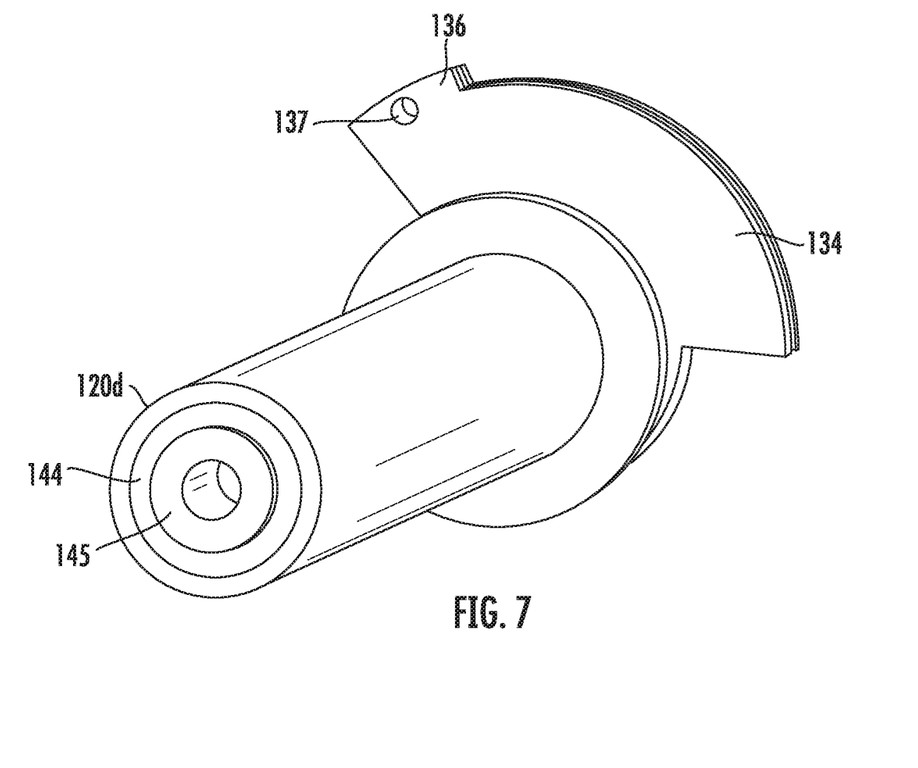
FIG. 7 is a perspective rear end view of the throttle tube of FIG. 3.
Figure 8:
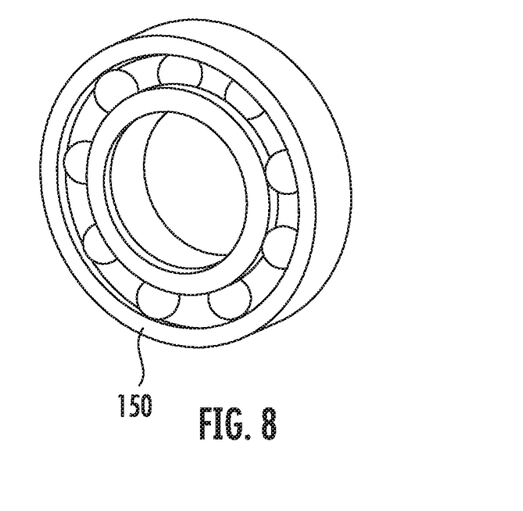
FIG. 8 is a perspective view of a bearing, such as a radial bearing, of FIG. 3.
Figure 9:
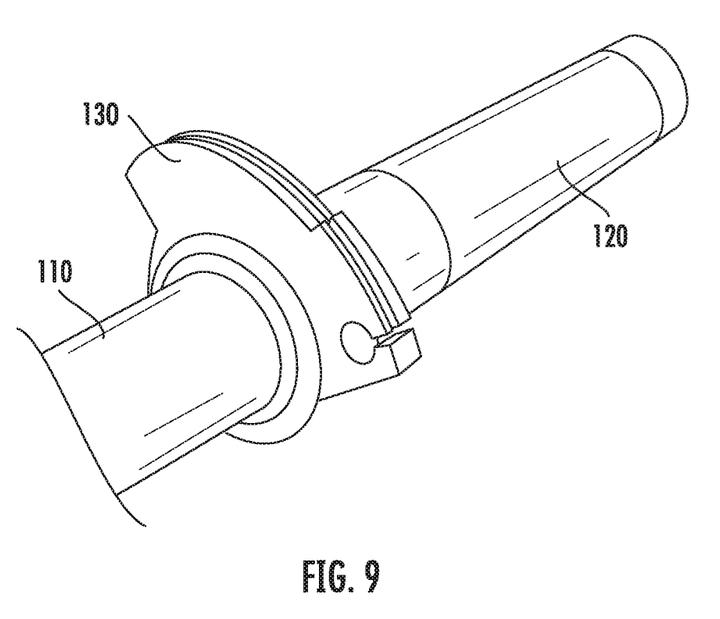
FIG. 9 is a perspective view of the throttle tube of FIG. 3 installed on a handle bar.

The hollow handle bar 110 may pass into the throttle tube 120 with the outer surface 112 of the handle bar bearing on the inner surface of the cable side bearing 144. Thus, the twisting of the throttle tube 120 causes it to move relative to the handle bar 110. However, due to the intermediary radial bearing 144, friction between the throttle tube 120 and the handle bar 110 is greatly reduced resulting in a much smoother operation of the throttle tube while avoiding the undesirable friction feeling. At the open end 110d of the handle bar 100 and throttle tube 120 arrangement, as can be seen in FIGS. 4 and 7, a post or radial bearing 140 may be provided to secure the free end of the handle bar 110 within the throttle tube 120.

Figure 10:
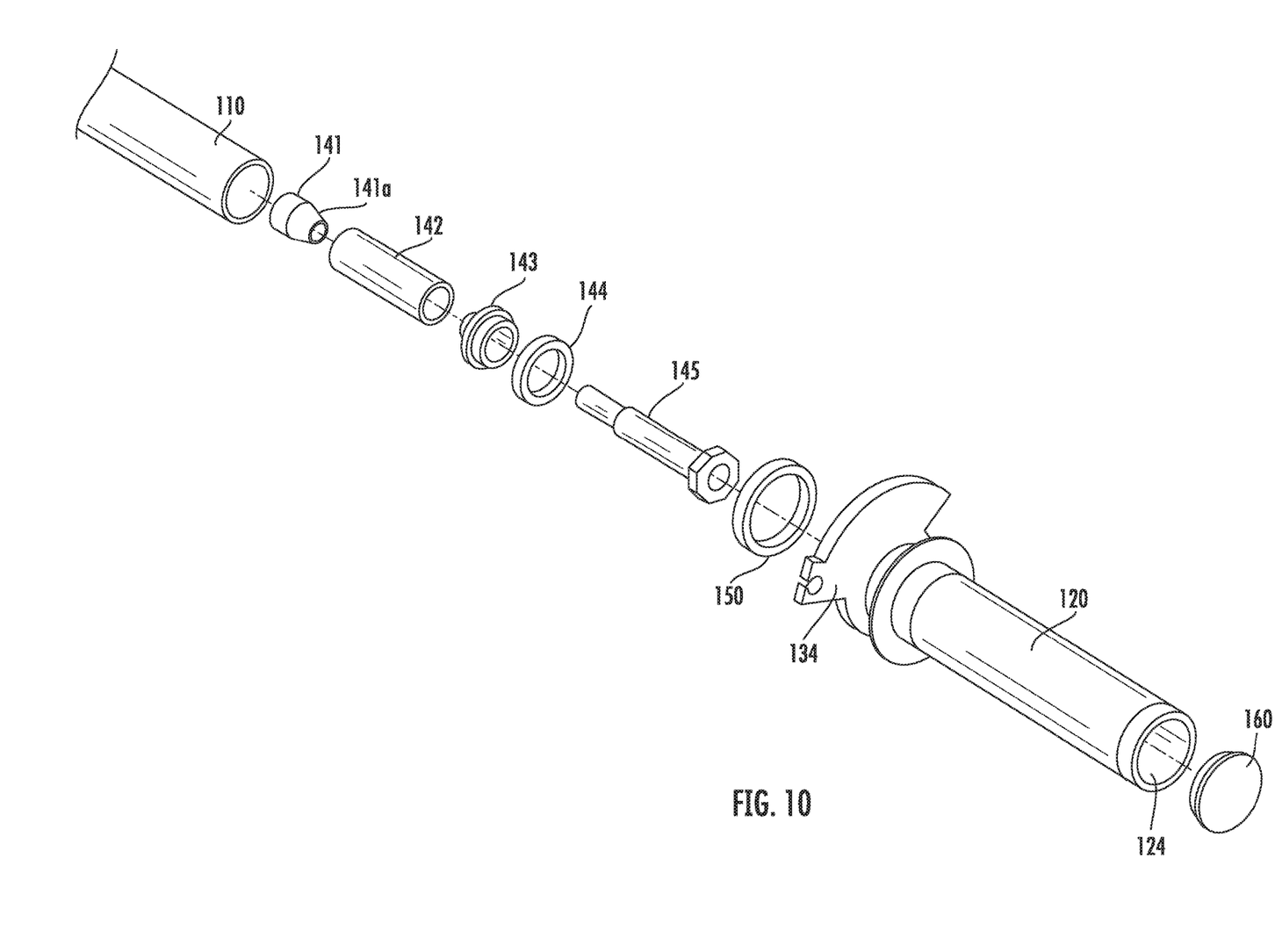
FIG. 10 is a front exploded view of the throttle tube of FIG. 3.
Figure 11:
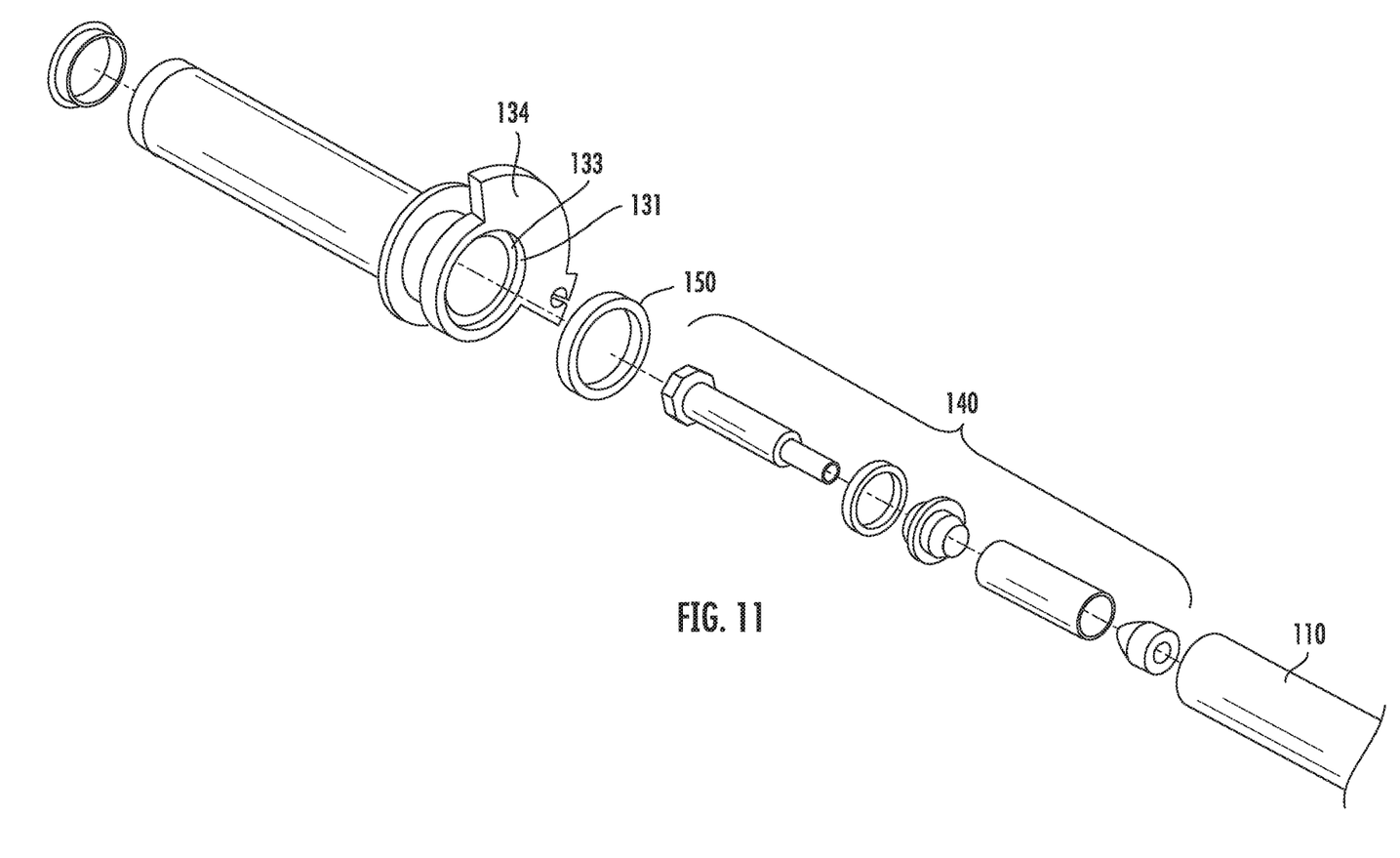
FIG. 11 is a rear exploded view of the throttle tube of FIG. 3.
Figure 12:
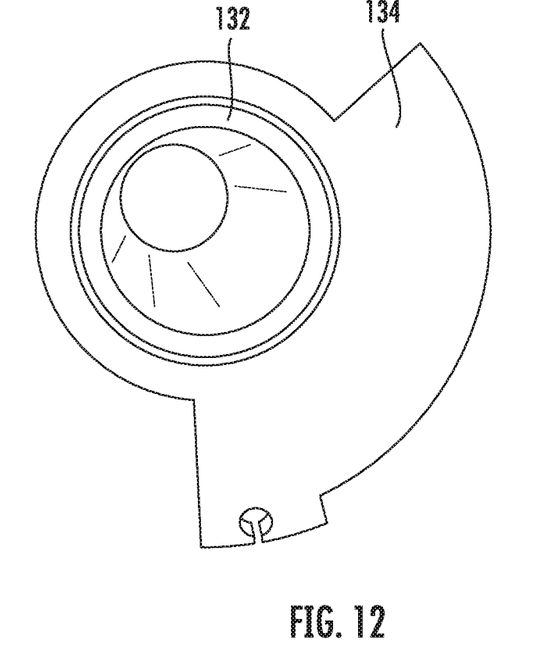
FIG. 12 is a front perspective view of the throttle tube of FIG. 3.

FIGS. 10 and 11 show exploded views of the throttle tube assembly 100 of the present invention to supplement FIGS. 3-9 herein. As can be seen in the perspective view of FIG. 11 and the reverse perspective view of FIG. 12, the throttle tube 120 assembly can be rotationally secured on the distal, free, end 120d with an expansion collet assembly 140. The expansion collet assembly 140 can secure the free end of the throttle tube 120d to the free (open) end of a handle bar 110d to thereby secure a radial bearing at the free end thereof. Similar to the radial bearing 150 on the proximal end of the throttle tube 120p, the expansion collet 140 can include a radial bearing 144 to radially, and rotationally, support the distal end of the throttle tube 120d. Details of this configuration can additionally be seen in FIGS. 12-14.

In the exemplary embodiment, as shown in FIGS. 10 and 11, the open end of a handle bar 110d can receive the expansion collet assembly 140 so that an expansion sleeve 142 is received in the inner surface of the handle bar. For example, the expansion collet 140 assembly can include a frusto-conical nut 141 at a proximal end. The conical portion 141a of the frusto-conical nut 141 can be received in a proximal end of an expansion sleeve 142. The expansion sleeve 142 can have a generally "zig-zag" tube configuration having a first diameter in a first configuration and upon an axially constricting force can have a second, larger, diameter. A nut 143 can be disposed on the distal end of the expansion sleeve 142 to support a tension rod 145 threaded through a radial bearing 144, the nut 143, expansion sleeve 142, and the frusto-conical nut 141. The proximal end of the tension rod 145 can be threaded to be received in a threaded through hole in the frusto-conical nut 141 to tension the expansion sleeve 142 when the expansion collet assembly 140 in disposed in the handle bar 110. When the tension rod 145 is engaged in the frusto-conical nut 141, the expansion sleeve 142 can expand to the second diameter. On a distal most end of the nut 143, a radial bearing 144 can be disposed. The throttle tube 120 can be threaded onto the handle bar 110, above the bearing 144 to support the inner surface of the throttle tube 120 about the handle bar 110. Alternatively, the expansion collet assembly 140 can be installed into the throttle tube 120, by way of the bearing 144, and then inserted into the handle bar. As shown, the expansion collet assembly 140 can be assembled and arranged such that the parts are all coaxial with one another, the throttle tube 120, and the handle bar 110.

As shown in at least FIG. 10, at the distal end of the throttle tube 120d, a bearing race seat 124 (shown as a stepped portion) may be provided to receive the radial bearing 145 of the expansion collet assembly 140. The bearing race seat 124 can serve as a stop to prevent the throttle tube 120 from being pushed too far on to the handle bars 110. As such, the bearing race seat 124 can prevent the throttle tube 120 from undesirably bottoming out when being installed on the handle bars 110. The bearing race seat 124 may be modified to accommodate a given type of bearing used. A cap 160 can be installed to close off the free end of the throttle tube 120 and handle bar 110.

Figure 13:
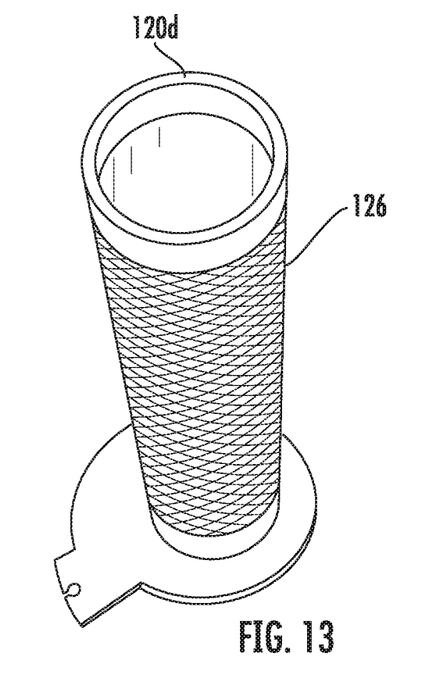
FIG. 13 is a perspective view of the throttle tube of FIG. 3.
Figure 14:
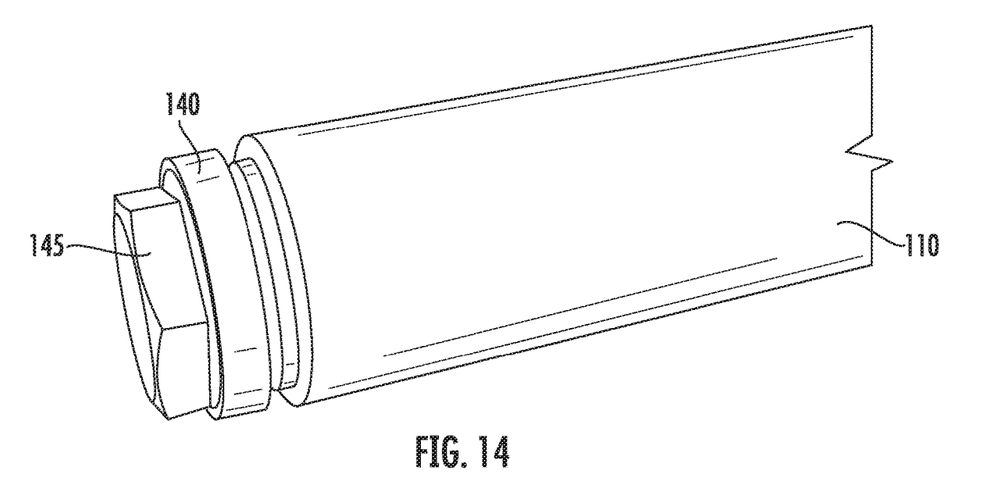
FIG. 14 is a perspective view of the handle bar and free end mount of the throttle tube of FIG. 3.
Figure 15:
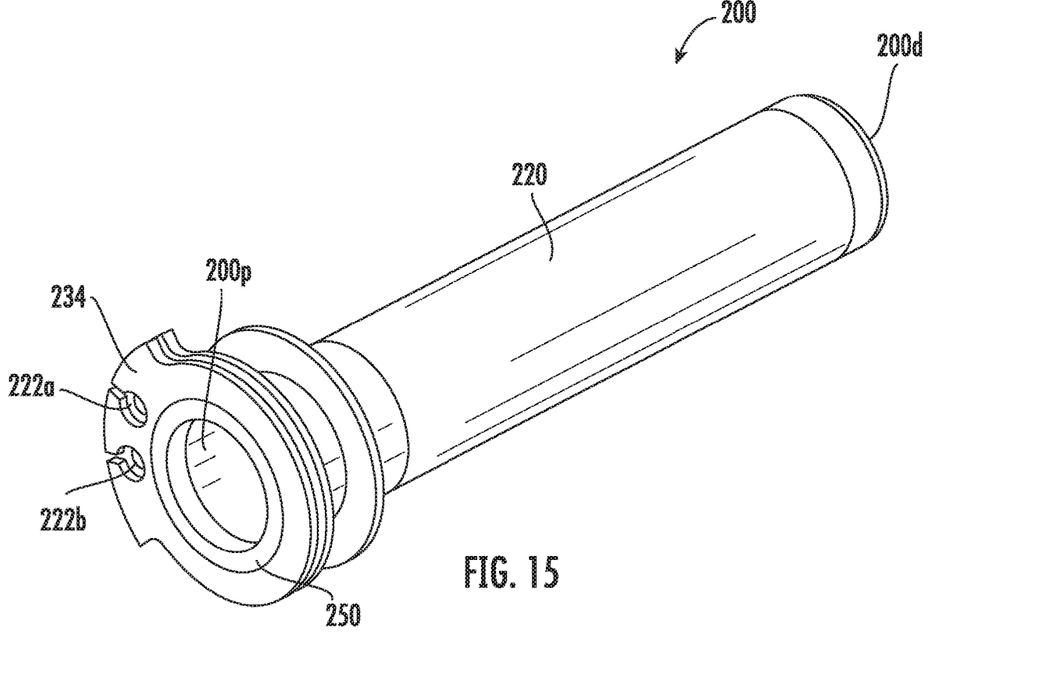
FIG. 15 is a perspective view of an alternative throttle tube.
Figure 16:
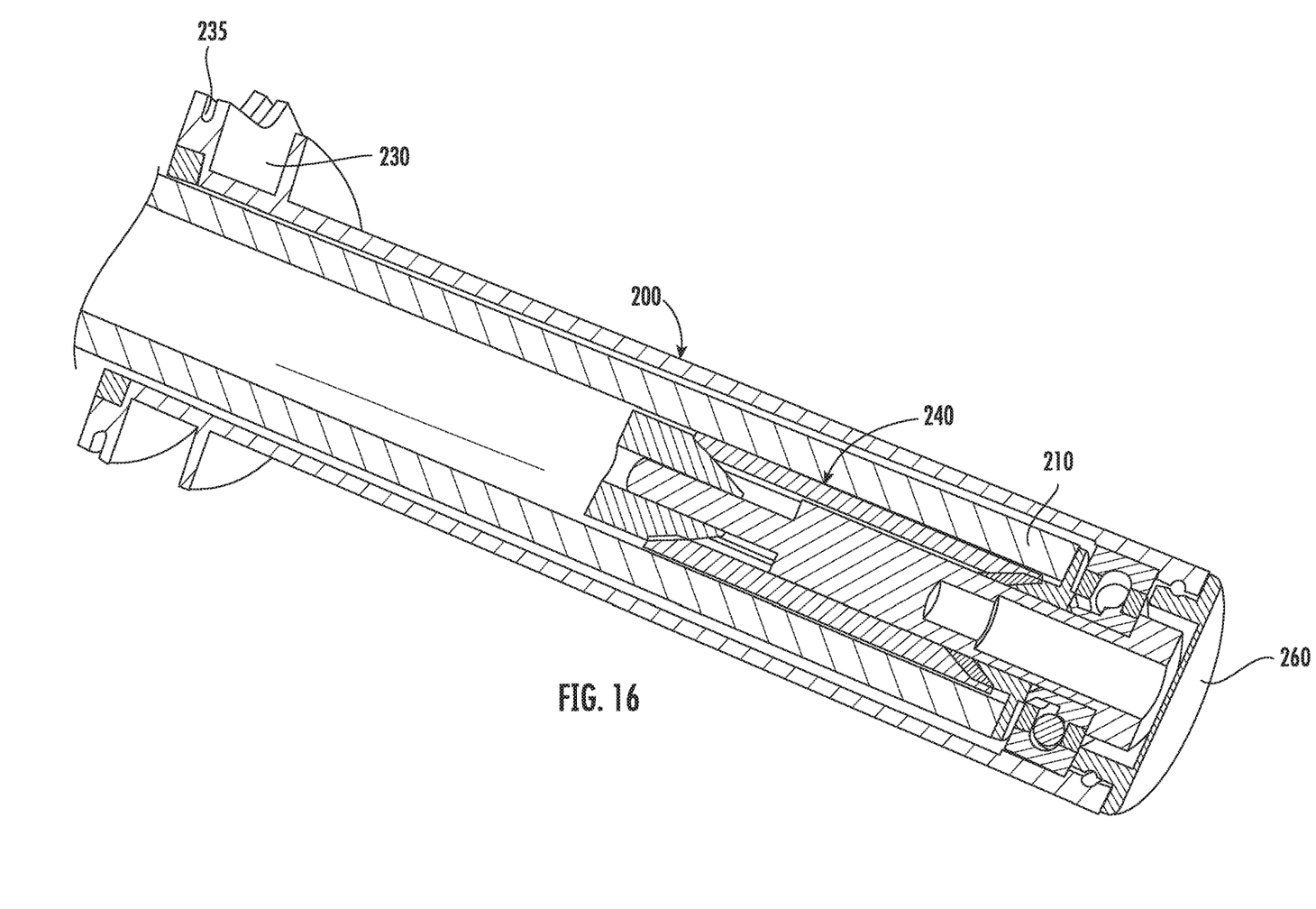
FIG. 16 is a cross-sectional view of the throttle tube of FIG. 15.
Figure 17:
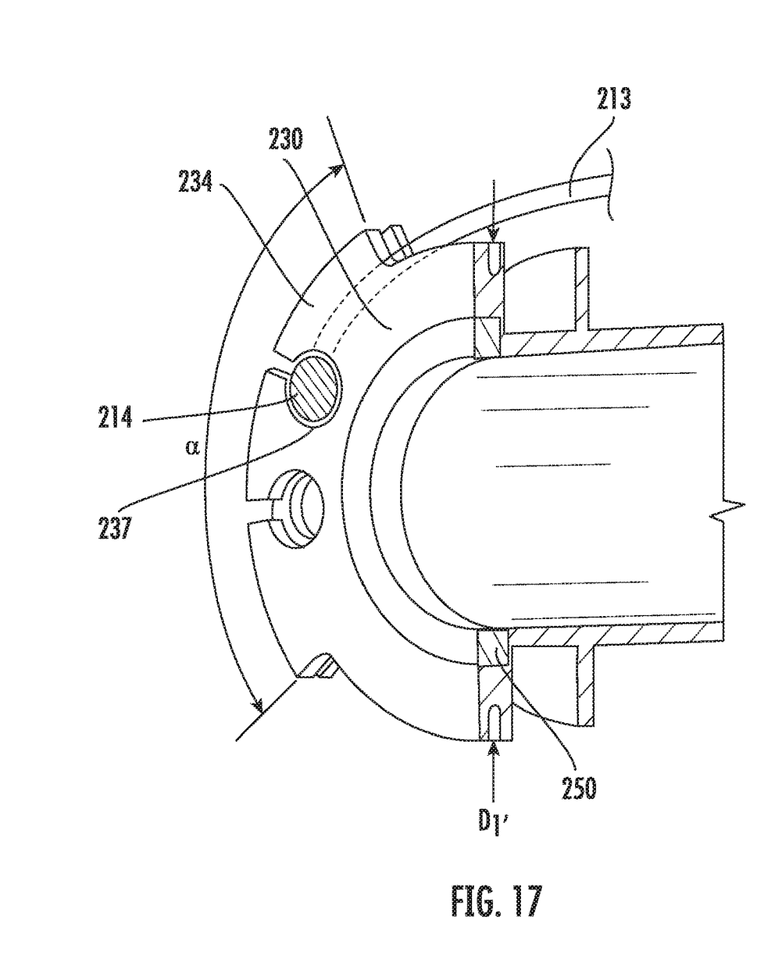
FIG. 17 is a partial cross-sectional view of the throttle tube of FIG. 15.
Figure 18:
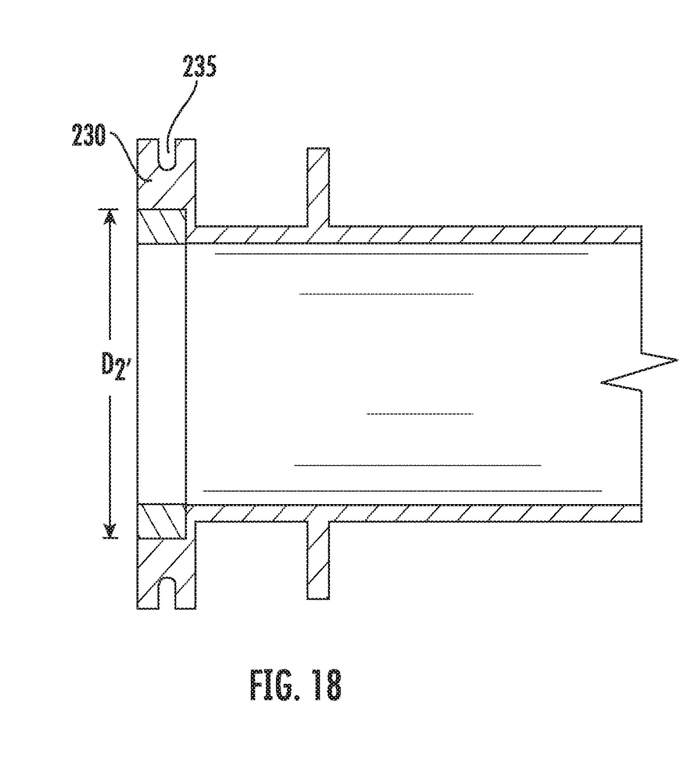
FIG. 18 is a partial cross-sectional view of the throttle tube of FIG. 15.
Figure 19:
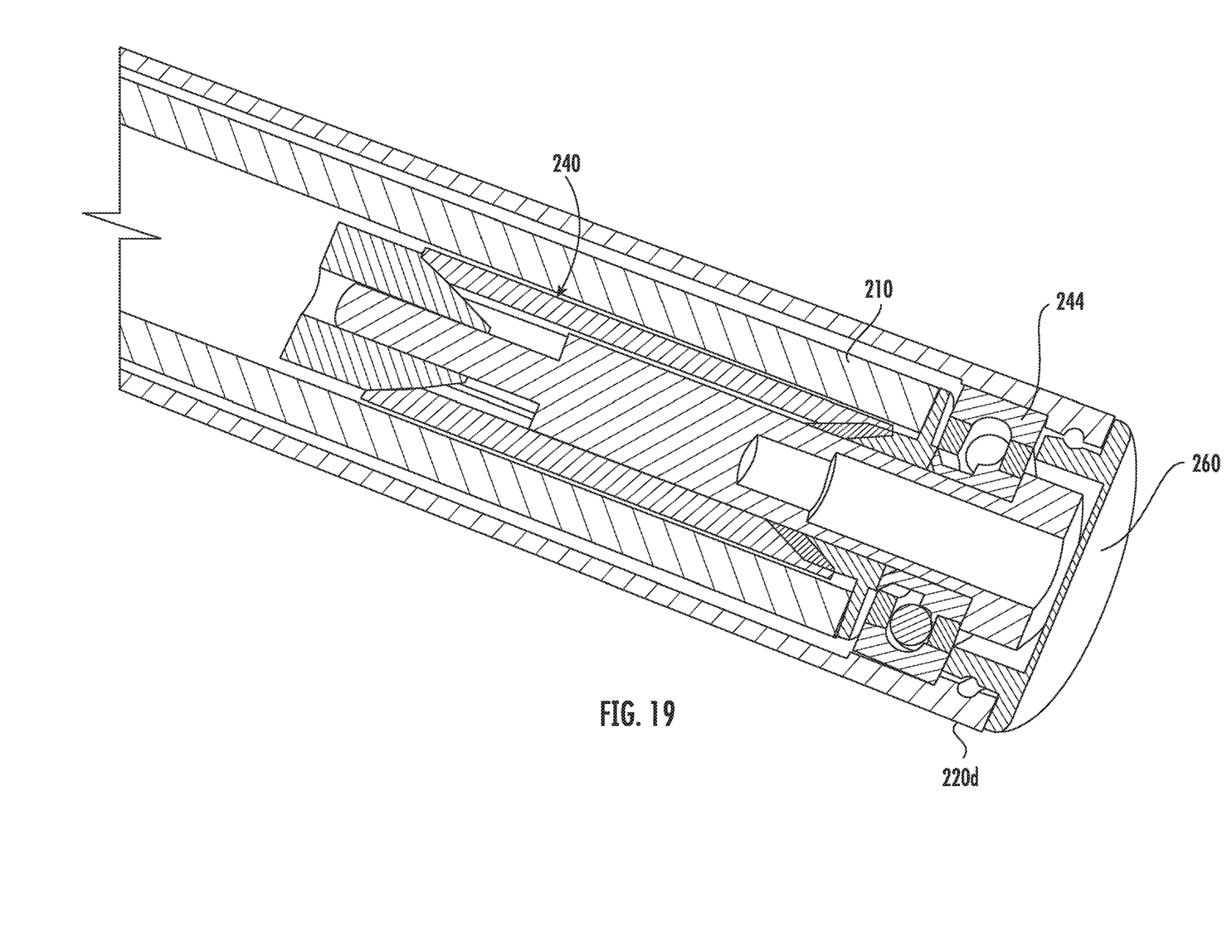
FIG. 19 is a partial cross-sectional view of the throttle tube of FIG. 15.

In an alternative embodiment, as illustrated in FIGS. 15-19, an alternative cable cam 230 and throttle tube 220 including the unique location of a cable side radial bearing 250 is shown. As can be understood, two radial bearings 244, 250 are preferably used, one at the free end 200d of the handle bar and another at the cable end 200p of the handle bar to thereby balance out the mating of the throttle tube 220 to the handle bar 210 for even free floating of the throttle tube 220. As best seen in FIGS. 13 and 19, a seat within the cam housing portion of the throttle tube is provided to receive the cable side radial bearing therein. FIGS. 15-19 show the unique positioning of the cable side radial bearing 250 within the cam housing 230 of the throttle tube 220 that is inline with the cable and the cable groove 235 in which the cable 213 is routed. Thus, the cable 213 rides on the outside of the tube and about the cable side bearing 250. As in the embodiment 100 above, two cables 213, with a securing ball or cylinder 214 on the free end thereof, may be used for additional control of the throttle tube 220. Therefore, the cable side bearing 250 is not only on the cable side but literally axially aligned with the cable groove 235 itself. As stated above, this portion of the throttle tube 220 is quite thick, unlike the thin portion of the throttle tube 220 that is grasped by the user, which enables a large radial bearing 250 to be used rather than a simple nylon sleeve. In other words, the location of the radial bearing 250 inline with the cable groove 235 enables the radial bearing 250 to be much larger and therefore more effective in reducing friction. This is a significant advance over prior art throttle tubes.

In the alternative embodiment, the assembly 200 can be substantially similar to the assembly 100 discussed above. However, the assembly can include an alternative cable connect 230 to receive a cable and ball or cylinder end which can be a generally partial cylindrical arc shape, extending an angle α, which has a larger outer diameter D1' than the remainder of the throttle tube 220, and a larger inner diameter D2' than the remainder of the throttle tube 220. The inner diameter of surface 231 of the cable connect 230 can abut a shoulder 233 of the throttle tube to define a bearing seat 232. The inner diameter surface 231 of the cable connect can have a length L. Integral to the cable connect 230, an arc shaped cam 234 can be disposed around a portion of the cable connect 230. In some embodiments, the arc 234 can extend over an angle α in the range of 45-135 degrees. In other embodiments, the arc 234 can extend a full 360 degrees around the throttle tube 220. The arc shaped cam 234 can include a circumferentially running groove 235 at the circumferential edge running the length of the arc 234. The groove 235 can be sized to receive at least one throttle cable 213 and secured in a seat 237 by a ball or cylinder 214, as is well known in the art. On the arc 234, a first cable connect 222a and a second cable connect 222b can be included to receive one or more throttle cable balls or cylinders 214 for securing one or more throttle cables 213 to the cable connect 230. While one cable 214 and one ball or cylinder 214 arrangement is shown, it should be understood that two throttle cables 213, respectively connected by two balls or cylinders 214 to the cam 234 is envisioned to suit the installation at hand.

Also, in the illustrated embodiment, the cable connect 230 is integral with the throttle tube 220. The arrangement can be described as the cable connect 230 and the throttle tube 220 being monolithic. In other, alternative arrangements throttle tube 220 and the cable connect 230 can be separate pieces that are fitted or fixed together.

The remainder of the assembly 200 is commensurate in scope with the embodiment of the assembly 100 discussed above. For the sake of brevity, while the structure of the radial bearing 250, expansion collet assembly 240, and the cap 260 will not be discussed in detail.

In accordance with the present invention, the throttle tube is of a unique and distinct configuration that is not found in the prior art. This unique design provides for an improved throttle tube configuration that avoids a friction feeling against the handle bar with a smoother and more consistent operation that is friction and maintenance free. [54] It would be appreciated by those skilled in the art that various changes and modifications can be made to the illustrated embodiments without departing from the spirit of the present invention. All such modifications and changes are intended to be covered by the appended claims.

What is claimed is:

1. A throttle tube assembly, comprising:
    a throttle tube extending along a central axis from a proximal most end to a distal most end, the throttle tube being monolithic, the throttle tube including
        a lumen extending through the throttle tube, the lumen having a first diameter;
        a cam housing disposed at the proximal end of the throttle tube having a proximal face that is axially aligned with proximal most end of the throttle tube, the cam housing including a radially disposed cable groove sized to fixedly receive a cable therein,
        a bearing seat aligned along the central axis with the cam housing, the bearing seat having a second diameter that is larger than the first diameter; and
    a bearing disposed in the bearing seat and the bearing is axially aligned with the cable groove.

2. The throttle tube assembly of claim 1, wherein the bearing is selected from the group consisting of a radial bearing, a needle bearing and a ball bearing.

3. The throttle tube assembly of claim 1, wherein the bearing is made of a material selected from the group consisting of metal and plastic.

4. The throttle tube assembly of claim 1, wherein a proximal face of the bearing is co-planar with a proximal most face of the throttle tube.

5. The throttle tube assembly of claim 1,
    wherein the bearing seat includes a shoulder and an inner face having a diameter, and wherein the diameter of the inner face is larger than the diameter of the lumen.

6. The throttle tube assembly of claim 5,
wherein the bearing seat has a depth that is substantially equal to a height of the bearing such that the bearing sits flush with the proximal most end of the throttle tube.

7. The throttle tube assembly of claim 1, further comprising, an expansion collet assembly radially supporting the distal end of the throttle tube on the handle bar.

8. The throttle tube assembly of claim 7,
wherein the expansion collet assembly includes a nut, an expansion sleeve, a bearing, and a tension rod, and
wherein the tension rod is disposed within the nut, expansion sleeve, and the bearing, and the tension rod is configured to expand the expansion sleeve to retain the expansion collet assembly within the handle bar.

9. The throttle tube assembly of claim 8,
wherein the bearing of the expansion collet assembly is disposed in a bearing race seat at a distal end of the throttle tube.

10. The throttle tube assembly of claim 1, wherein the cable is fixedly secured by a ball or cylinder on the free end of the cable to the cam housing.

11. A throttle tube for a motorized vehicle, comprising:
a tube having an open cable side end with a cable cam portion and an opposing outer end; the tube having an inner surface having a first diameter; and
a bearing residing within the cable cam portion and being secured within the tube, the bearing having an outer diameter that is larger than the first diameter, the bearing being inline with the cable cam portion;
wherein the bearing is configured and arranged to rotatably receive a handle bar therein thereby reducing the friction of bearing between the handle bar and the inner surface of the tube, and
wherein the tube, including the cable cam portion, is a single piece.

12. The throttle tube of claim 11, wherein the bearing is selected from the group consisting of a radial bearing, a needle bearing and a ball bearing.

13. The throttle tube of claim 11, wherein the bearing is made of a material selected from the group consisting of metal and plastic.

14. The throttle tube of claim 11, the cable cam portion further comprises:
a flange extending from the tube; the flange defining a connector for connection of a cable thereto.

15. The throttle tube of claim 14, wherein the bearing is disposed substantially co-axial with the connector for the cable.

16. The throttle tube of claim 14, wherein the cable is fixedly secured by a ball or cylinder on the free end of the cable to the tube.

* * * * *